(12) United States Patent
O'Hagan

(10) Patent No.: US 10,659,624 B2
(45) Date of Patent: May 19, 2020

(54) SYSTEM AND METHOD FOR CONTROLLING THE PRINTING OF DOCUMENTS, AND PERFORMING ANALYTICS REGARDING DOCUMENTS PRINTED, IN A DISTRIBUTED ENTERPRISE ENVIRONMENT

(71) Applicant: Open Text SA ULC, Halifax (CA)

(72) Inventor: Paul O'Hagan, Brooklin (CA)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 16/028,198

(22) Filed: Jul. 5, 2018

(65) Prior Publication Data
US 2019/0014222 A1    Jan. 10, 2019

Related U.S. Application Data

(60) Provisional application No. 62/529,290, filed on Jul. 6, 2017.

(51) Int. Cl.
*H04N 1/00* (2006.01)
*G06F 3/12* (2006.01)

(52) U.S. Cl.
CPC ....... *H04N 1/00039* (2013.01); *G06F 3/1205* (2013.01); *G06F 3/1245* (2013.01); *G06F 3/1259* (2013.01); *G06F 3/1274* (2013.01)

(58) Field of Classification Search
CPC .............. H04N 1/00039; H04N 1/2166; G06F 3/1274; G06F 3/1205; G06F 3/1245; G06F 3/1259; G06F 3/1273; G06F 3/1267; G06F 3/127
See application file for complete search history.

(56) References Cited

U.S. PATENT DOCUMENTS

| | | | |
|---|---|---|---|
| 2005/0065987 A1* | 3/2005 | Telkowski | G06F 11/0727 |
| 2013/0050756 A1* | 2/2013 | Hosotsubo | H04N 1/00344 358/1.15 |
| 2018/0096201 A1* | 4/2018 | Bermundo | G06K 9/00456 |

* cited by examiner

*Primary Examiner* — Kent Yip
(74) *Attorney, Agent, or Firm* — Sprinkle IP Law Group

(57) ABSTRACT

Embodiments of a print analysis system are disclosed herein. Embodiments of these print analysis systems may include a print analyzer deployed on one or more printers within an enterprise environment and executing on the printers themselves. The print analyzer on the printer may then apply one or more print analysis rules to a document. Additionally, or alternatively, the print analyzer may send the document to a content management system for storage in a workspace or other storage area corresponding to printed documents of the enterprise. The documents in the workspace on the content management system may be evaluated or analyzed to provide understanding or insight into the documents printed in the enterprise environment.

16 Claims, 2 Drawing Sheets

SYSTEM AND METHOD FOR CONTROLLING THE PRINTING OF DOCUMENTS, AND PERFORMING ANALYTICS REGARDING DOCUMENTS PRINTED, IN A DISTRIBUTED ENTERPRISE ENVIRONMENT

RELATED APPLICATION(S)

This application claims a benefit of priority under 35 U.S.C. § 119 from U.S. Provisional Patent Application No. 62/529,290 filed Jul. 6, 2017, by inventor O'Hagan, entitled "SYSTEM AND METHOD FOR CONTROLLING THE PRINTING OF DOCUMENTS, AND PERFORMING ANALYTICS REGARDING DOCUMENTS PRINTED, IN A DISTRIBUTED ENTERPRISE ENVIRONMENT," the entire contents of which are hereby fully incorporated by reference herein for all purposes.

TECHNICAL FIELD

This disclosure relates generally to document printing. In particular, embodiments of this disclosure relate to systems and methods for controlling the printing of documents. Even more specifically, embodiments of this disclosure relate to controlling the printing of documents and obtaining understanding and insight into documents printed across an enterprise environment.

BACKGROUND

In many of today's large enterprises, such as corporations or governmental institutions, security is of the utmost importance. These security concerns extend to the documents that are utilized by the entities making up those enterprises. Therefore, to help ensure the security of those documents in many instances these enterprises may employ a content management system (also referred to as an enterprise content management system or platform). Such content management systems may secure access to managed documents and manage, or otherwise control, printing or versioning of these documents.

While these content management systems may be helpful in managing documents already contained in the ecosystem or infrastructure of an enterprise, they do nothing to assist in the control of documents that originate outside the enterprise or are not managed by the content management system. Thus, for example, documents created or accessed by users within an enterprise, stored locally on the user's system, stored on a portable storage media (e.g., a USB or Flash drive) or stored in the cloud (e.g., residing on a Google Drive), may still present a security risk. In large part, such security risks come from the printing of these documents. In fact, by some estimates the largest cause of data loss or data breach within enterprises is the unauthorized printing of documents.

What enterprises desire therefore, are systems and methods for controlling the printing of documents within the enterprise. Additionally, and importantly, enterprises also desire to understand or otherwise gain insight into the quantity or types of documents that are being printed or the users who print them, such that additional, or different, security measures may be employed with respect to printed documents or, more generally, that the volume of documents being printed may be reduced.

SUMMARY

To those ends, among others, embodiments of a print analyzer are disclosed herein. The print analyzer may be deployed on one or more printers within an enterprise environment and execute on the printers themselves. This deployment may occur, for example, by individually installing the print analyzer on individual printers or deploying the print analyzer substantially enterprise wide to a majority (or substantially all) the printers in an enterprise environment using, for example, a print management solution.

The print analyzer may be integrated with a print driver, may be called from a print driver or may emulate an interface of the print driver. The print analyzer can thus be invoked or adapted to operate after the print driver receives a document printed from the various devices within the enterprise environment as the document is sent to the printer for printing. In particular, the print driver may store a received document in the memory of the printer in a print stream format (e.g., such as Advanced Function Presentation (AFP), Metacode/DJDE, Line data, PCL or PDF format). The print analyzer may convert the document into a canonical format (if necessary) or create a copy in the canonical format. This canonical format may be PDF, for example. The document in the canonical format may be processed (if necessary) such that text within the received document (in the canonical format) may be recognized. Embodiments of such processing may include performing Optical Text Recognition (OCR) or the like.

The print analyzer on the printer may then apply one or more print analysis rules to the document. In particular, the print analyzer may include a set of rules, where each rule has a trigger and an action. The trigger for a rule may include a regular expression (e.g., regex or rational expression defined by a series of characters) that defines a search pattern corresponding to a type of data (such as, for example, a social security number, a credit card number, a bank account number, a patient identifier, etc.). To evaluate a trigger for a rule then, the print analyzer may search the (converted) document based on the regular expression of the trigger to determine if the document includes any data matching the regular expression of the trigger for the rule.

If the evaluation of the trigger indicates that the rule should be applied (e.g., the search for the regular expression determines that there is data (e.g., a text string) in the document corresponding to the regular expression), the action of the rule may be applied. These actions may include cancelling the printing of the document, redacting the document of the identified data, or sending an alert to someone within the enterprise via an electronic communication. The document (or redacted document) may then be printed (e.g., if allowed). This printing may be accomplished by converting the processed (e.g., redacted, etc.) converted document back to a print stream format and providing the processed document in the print stream format to the print driver of the printer.

Additionally, or alternatively, in one embodiment, the print analyzer may send the document to a content management system for storage in a workspace or other storage area corresponding to printed documents of the enterprise. The print analyzer may, for example, send every received document to the content management system, or the sending of the document may be an action associated with a rule such that the document may be sent only if that rule is applied. In one embodiment, the converted document may be sent to the content management system after a received document is converted but before any rules are applied to the document.

The documents in the workspace on the content management system may be evaluated or analyzed to provide understanding or insight into the documents printed in the enterprise environment. In one embodiment, a classifier may be run on the documents stored in the workspace of the content management system to classify each of the documents (e.g., if possible). Using the results of the classification (and possibly user identifiers for users of the enterprise associated with the documents in the workspace) a set of analytics related to the type or volume of the document being printed within the enterprise may be created and presented to users of the enterprise (e.g., administrators or the like).

In other embodiments, instead of being integrated with a print driver on a printer, the print analyzer may be integrated with a print driver on devices distributed throughout the enterprise (e.g., user computing devices from which documents may be printed). Again, the print analyzer may be integrated with a print driver on these computing devices, may be called from a print driver on the devices, or may emulate an interface of the print driver. The print analyzer can thus be invoked or adapted to operate after the print driver on the device receives a document printed at that device before the document is sent to the printer for printing. In particular, the print analyzer may receive the document in a print stream format and convert the document into a canonical format. The print analyzer may send the document to a content management system for storage in a workspace or other storage area corresponding to printed documents of the enterprise.

Specifically, the print analyzer may be configured with an interface to use (e.g., an address for a REpresentational Sate Transfer (REST) interface, a Universal Resource Locator (URL), Application Programming Interface (API)) and a workspace location or storage area to include in the call. The print analyzer on the device can then make a call to the configured interface including the document and specifying the workspace or other storage area. The documents in the workspace on the content management system may be evaluated or analyzed to provide understanding or insight into the documents printed in the enterprise environment.

As can be seen then, embodiments of a print analyzer presented herein may have a number of advantages. Importantly, for example, embodiments of a print analyzer may be applied at a printer itself, allowing even those documents that are not managed within the context of the enterprise, or which originate from sources external to an enterprise, to be analyzed and actions taken with respect to the printing of these documents. Moreover, embodiments of such a print analyzer may be applied across printers of an enterprise, almost regardless of the type or manufacturer of those printers. Additionally, embodiments of such a print analyzer may act in real-time to dynamically inspect the printed document and take any associated actions, substantially without interfering with the speed of the printing of documents. As a further advantage, these print analyzers may be utilized to capture and store the documents being printed across the enterprise, allowing further classification or the other analytics to be performed regarding the enterprise wide printing of documents. Moreover, by implementing such print analyzers on the printers themselves, computing resources within the enterprise environment may be more efficiently utilized, as a processor and memory on the printer which may otherwise be underutilized may instead be used to collect, analyze or otherwise manage such documents.

In one embodiment, a system for controlling the printing of documents in an enterprise environment may be implemented on a printer coupled to a set of computing devices of an enterprise over a network and adapted to print documents received at the printer. The system may include a print driver for receiving documents to be printed from computing devices and a print analyzer communicating with the print driver on the printer. The print analyzer may receive a document from the print driver in a print stream format, convert the received document from a print stream format to a canonical format and apply a set of print analysis rules to the converted document. Each of the print analysis rules may include a trigger including a regular expression and an associated action. Applying a rule can therefore include searching the converted document using the regular expression of the trigger to determine if the converted document contains any data matching the regular expression, and taking the associated action of the rule when the regular expression is matched.

In some embodiments the print analyzer may send the document to a content management system, wherein sending the document to the content management system comprises calling an interface of the content management system with a named workspace provided by the content management system and the document.

In a particular embodiment, the content management system includes an enterprise analysis system for accessing the named workspace at the content management system, analyzing the documents stored in the named workspace to determine one or more statistics regarding documents in the workspace printed across the enterprise environment, and providing an interface to access the one or more statistics regarding the documents in the workspace printed across the enterprise environment.

In certain embodiments, the analysis of the documents to determine one or more statistics regarding documents in the workspace printed across the enterprise environment comprises determining one or more classes for the documents in the workspace printed across the enterprise environment, and associating each of the documents in the workspace with one of the classes.

In one embodiment, the action is cancelling the printing of the document at the printer, redacting the document of the data in the document matching the regular expression, or sending an alert to a specified destination.

In a specific embodiment, the document is received with a user identifier for the user who printed the document and sending an alert to a specified destination comprises requesting the specified destination associated with the user identifier from a directory server.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
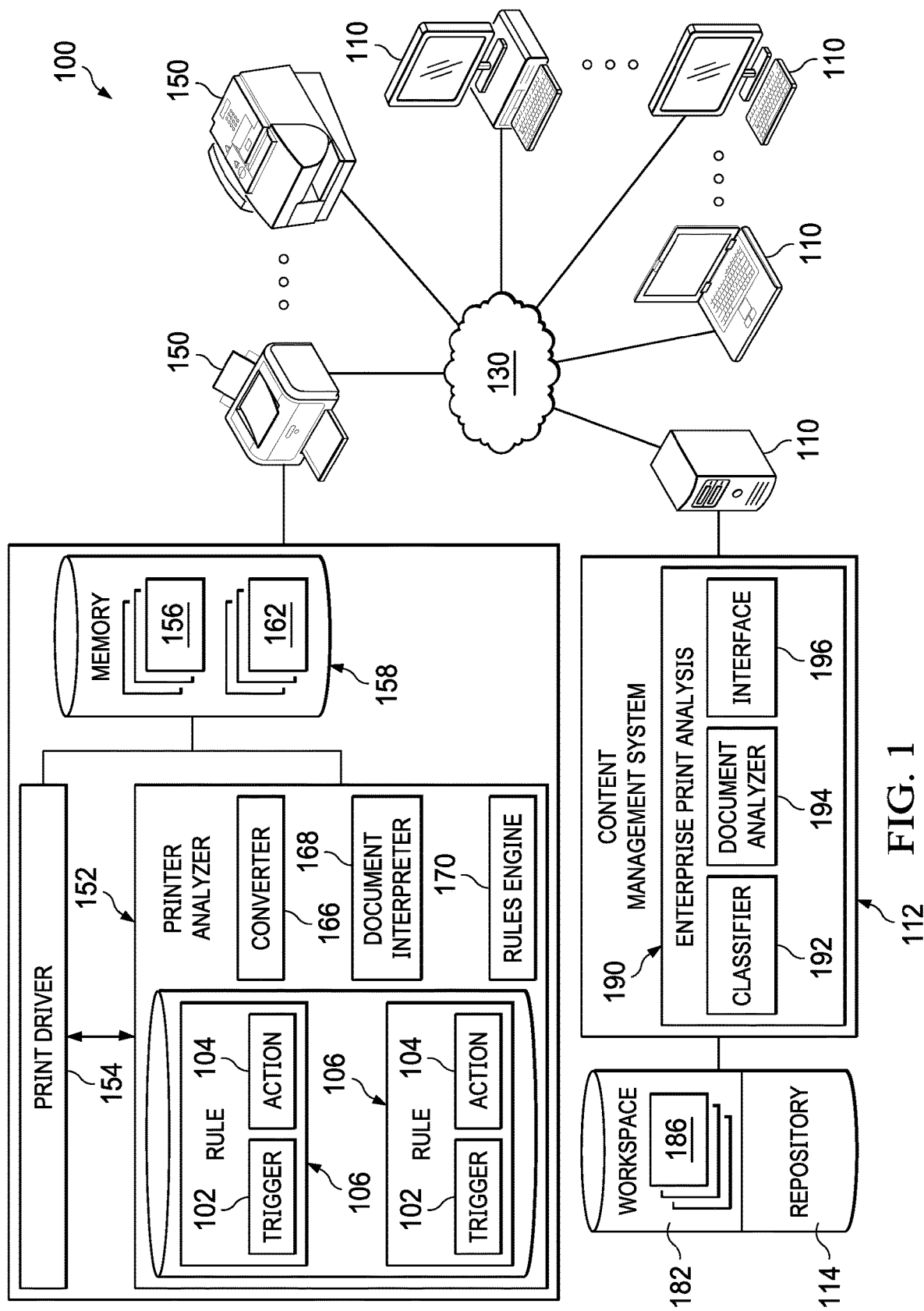
FIG. 1 depicts one embodiment of an enterprise environment where an embodiment of a print analyzer is deployed on printers within the enterprise.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before discussing embodiments in detail, some context may be useful. As discussed, enterprises may desire systems and methods for controlling the printing of documents within the enterprise. Additionally, and importantly, enterprises may also desire to understand or otherwise gain insight into the quantity or types of documents that are being printed or the users who print them, such that additional, or different, security measures may be employed with respect to printed documents or, more generally, that the volume of documents being printed may be reduced.

To those ends, among others, embodiments of a print analyzer are disclosed herein. The print analyzer may be deployed on one or more printers within an enterprise environment and execute on the printers themselves. This deployment may occur, for example, by individually installing the print analyzer on individual printers or deploying the print analyzer substantially enterprise wide to a majority (or substantially all) the printers in an enterprise environment using, for example, a print management solution. The print analyzer on the printer may then apply one or more print analysis rules to the document. Additionally, or alternatively, in one embodiment, the print analyzer may send the document to a content management system for storage in a workspace or other storage area corresponding to printed documents of the enterprise. The documents in the workspace on the content management system may be evaluated or analyzed to provide understanding or insight into the documents printed in the enterprise environment.

In other embodiments, instead of (or in addition to) being integrated with a print driver on a printer, a print analyzer may be integrated with a print driver on devices distributed throughout the enterprise (e.g., user computing devices from which documents may be printed). The print analyzer can be invoked or adapted to operate after the print driver on the device receives a document printed at that device before the document is sent to the printer for printing. The print analyzer may send the document to a content management system for storage in a workspace or other storage area corresponding to printed documents of the enterprise such that printed documents may be evaluated or analyzed to provide understanding or insight into the documents printed in the enterprise environment.

FIG. 1 depicts one embodiment of an enterprise environment where an embodiment of a print analyzer is deployed on printers within the enterprise. An enterprise computing environment 100 may include a number of computing devices 110 and printers 150 connected to a network 130 (e.g., the Internet, an intranet, an internet, a Wide Area Network (WAN), a Local Area Network (WAN), a cellular network, a wireless or wireline network, or some combination of networks). A printer 150 may, for example, be a Multi-Function Device (MFD) or Printer (MFP). One of these computing devices 110 may include a content management system 112 and an associated document repository 114 for managing documents of the enterprise. One such example of a content management system 112 is OpenText's Livelink or OpenText's Content Suite. As is known in the art, documents may be added to the content management system 112 (e.g., and stored in the repository 114) through an interface provided by the content management system 112. The content management system 112 may secure access to managed documents and manage or otherwise control these documents.

Users at particular computing devices 110 may print document from these devices 110 at a printer 150 within the enterprise computing environment 110. These documents may be documents managed by the content management system 112. However, in many cases, the documents printed by the users at the computing devices 110 may not be managed by the content management system 112. For example, these printed documents may be documents created and stored by a user locally on their device 110, a document accessed from a portable storage media (e.g., a USB or Flash drive) or a document downloaded or accessed from a source external to the enterprise (not shown) over network 130. These documents may originate from a source on the Internet or be documents stored in the cloud, such as those residing in a document sharing service or at a cloud based storage provider. The enterprise (e.g., its operators, owners, managers, administrators, etc.) may, however, still desire to control the security of such documents, or have policies that pertain to what may (or may not be) printed in the enterprise.

As discussed, as these documents are not managed by the content management system 112 of the enterprise (or otherwise managed or controlled by the enterprise), control over the printing of these documents is difficult. Accordingly, to control the printing of documents within the enterprise, the enterprise may include print analyzer 152 (also referred to as the print analytics module) on one or more of the printers 150 in the enterprise environment 100.

The print analyzer 152 may be integrated with a print driver 154, may be called from a print driver 154 or may emulate an interface of the print driver 154. The print analyzer 152 may be, for example, integrated with the print driver 154 and installed on the printer 150 with the print driver 154. In this manner, the print analyzer 152 may be installed in association with the update or distribution of the print driver 154 on the printer 150. For example, a print driver 154 including the print analyzer 152 may be distributed by, for example, a print management solution employed in the enterprise environment 100. The print analyzer 152 may thus execute on a processor of the printer 150 (not shown) and utilize the memory 158 of the printer 150.

When a document is printed by a user at a device 110, the document is sent from the (sending) print driver on the user device 110 to the (receiving) print driver 154 at the printer 150. The print driver 154 on the printer 150 thus receives the document in a print stream format (e.g., such as Advanced Function Presentation (AFP), Metacode/DJDE, Line data, PCL or PDF format) and stores the received document 156 (in the print stream format) in the memory 158 of the printer 150. This memory 158 may be a computer readable storage media adapted to store data, such as Random Access Memory (RAM) on the printer 150, a flash memory, a disk, or another type of memory.

The print analyzer 152 is adapted to be invoked, execute, or otherwise operate after the print driver 154 receives the document and stores the document 156 (in the print stream format) in the memory 158 of the printer 150. The print analyzer 152 includes converter 166 that may convert the document 156 into a canonical format (if necessary) or create a copy and store this converted document 162 in memory 158. The canonical format may be PDF, for example. It will be noted that the original document 156 in the print stream format may be left in memory 158 or may be deleted by the converter 166 at the time the conversion operation occurs. Alternatively, the original document 156 may be converted into the canonical format such that the converted document 162 replaces the original document 156 in memory 158.

Document interpreter 168 of the print analyzer 152 may process the copy of the document 162 in the canonical format such that text within the received document (in the canonical format) may be recognized or a text based search can be performed on the document 162. Embodiments of such processing include performing Optical Text Recognition (OCR) or the like.

The print analyzer 152 on the printer 150 may then apply one or more print analysis rules 106 to the received document. These rules 106 may form a part of the print analyzer 152 and may be deployed with the print analyzer 152. In particular, the print analyzer 152 may include a set of rules 106, where each rule has a trigger 102 and a corresponding action 104. The trigger 102 for a rule 106 may include a regular expression (e.g., regex or rational expression defined by a series of characters) that defines a search pattern corresponding to a type of data (such as, for example, a social security number, a credit card number, a bank account number, a patient identifier, etc.). To evaluate a trigger for a rule then, a rules engine 170 may access the rules 106 of the print analyzer 152 and evaluate each rule 106 against the converted document 162 stored in the memory 158 of the printer. To evaluate a rule 106, the rules engine 170 may search the (converted) document 162 for the regular expression of the trigger 102 to determine if the document 162 includes any data matching the regular expression of the trigger 102 for the rule 106.

If the evaluation of the trigger 102 indicates that the rule 106 should be applied (e.g., the search for the regular expression determines that there is data (e.g., a text string) in the document 162 corresponding to the regular expression), the action 104 of the rule 106 may be applied by the rules engine 170. These actions 104 may include cancelling the printing of the document, redacting the document of the identified data or sending an alert to someone within the enterprise via an electronic communication.

If the action 104 includes the redaction of the document 162, the rules engine 170 may determine the location of each of the data (e.g., text string) in the converted document 162 associated with the trigger 102 and modify the converted document 162 to exclude this data. The exclusion of the data may comprise, for example, removing the data identified using the trigger 102 of the rule 106 from the converted document 162 or drawing an opaque black rectangle or other shape over the identified data by modifying the converted document 162 to include such a shape at the same location as the identified text.

If the action 104 indicates an alert is to be sent, the action 104 may indicate the destination and content of that alert. The rules engine 170 can then send an alert (e.g., an email) with the specified content to the specified destination. Alternatively, the rules engine 170 may be adapted to interact with a directory server (e.g., an Lightweight Directory Access Protocol (LDAP) server) in the enterprise environment 100 or the content management system 112 to obtain a destination (e.g., email address, etc.) associated with the user who printed the document 156, such as a supervisor, manager or system administrator associated with the identified user.

Specifically, in one embodiment, when a document 156 is received at the print driver 154 it may be received with an identifier of the user who printed the document. This user identifier (e.g., username or network identifier for the user within the enterprise environment 100) may be stored in association with the document 156 (e.g., as metadata or other associated data of the document 156) in the memory 158 of the printer 150. This identifier may be used by rules engine 170 to request a supervisor or other contact or destination associated with the user identifier from the content management system 112 or a directory server within the enterprise environment 100. The rules engine 170 can then send an alert (e.g., an email) to the specified destination. This email may include, for example, an identification of the document 156 printed or may include a copy of the converted document 162 (e.g., a copy of the unmodified converted document 162 or a copy of the modified converted document 162, etc.). Other alerts are possible and are fully contemplated herein.

After the rules engine 170 has applied the rules 106, the print analyzer 152 may print the converted document 162 if printing of the document is allowed (e.g., in its redacted or modified form if the applications of any rules 106 has resulted in actions 104 that modified the converted document 162). Specifically, the print analyzer 152 may convert the processed converted document 162 back to a print stream format and return control back to the print driver 154 which can print the (e.g., processed, redacted, etc.) document on the printer 150.

Additionally, in one embodiment, the print analyzer 152 may send a copy of the received document to the content management system 112 such that analysis of the document or printed documents generally may occur. In one embodiment, when the print analyzer 152 is invoked, executed, or otherwise operated after the print driver 154 receives the document and stores the document 156 (in the print stream format) in the memory 158 of the printer 150, the print analyzer 152 may send the document to the content management system 112. In one embodiment, the print analyzer 152 may apply converter 166 to convert the document 156 and document interpreter 168 such that text within the received document (in the canonical format) may be recognized before the converted document 162 is sent to the content management system 112.

In particular, in certain embodiments, the content management system 112 may include a named workspace 182 (e.g., a folder or other location) for storing and managing printed documents. Such a workspace 182 may, for example, be configured in the content management system 112 by an administrator associated with the enterprise. Print analyzer 152 may be adapted to add the received document to this workspace 182 by calling an interface of the content management system 112 identifying the named workspace 182 and providing the converted document 162. This call may, for example, be a request to the interface of the content management system 112 that has as its parameters the name of the workspace 182 and the document data. Other data may be provided to the content management system 112 with the document 162 in the call or subsequently thereto, including, for example, an identifier of the user that printed the document, the time the document was printed or other data. Accordingly, when the document is received at the content management system 112 through the interface, the document 186 can be stored in the workspace 182. Additionally, any other data received with the document 186 (e.g., user identifier, time of printing, identifier of the printer 150 that sent the document 186, etc.) may be stored in association with the document 186 (e.g., as metadata of the document 186).

As may be seen, then, the workspace 182 may include documents 186 printed on printers 150 across the enterprise environment 100. Accordingly, an analysis of these documents 186 may provide a great deal of understanding or insight into the documents being printed. Using these insights the operators or administrators of the enterprise may decide to employ additional, or different, security measures with respect to printed documents or, more generally, take action such that the volume of documents being printed within the enterprise environment may be reduced.

An enterprise wide print analysis system 190 may thus be implemented in the enterprise environment 100. This enterprise print analysis system 190 may be included on the content management system 112 itself, or may be on another computing device 110 of the enterprise environment and adapted to access the workspace 182 including the documents 186 printed across the enterprise environment 100. The enterprise wide print analysis system 190 may include a document analyzer 194 that may determine one or more statistics regarding the document 186 (e.g., where they were printed, volume of documents printed, types of documents printed, users who printed documents, etc.) and display such statistics to users through an interface 196 of the enterprise wide print analysis system 190.

In one embodiment, the enterprise print analysis system includes a classifier 192. This classifier 192 may be adapted to classify each document 186 as one or more types of documents. This determination, may, for example, also include the determination of one or more classifications or classes into which the documents should be grouped. Specifically, in one embodiment, the classifier 192 may include one or more machine learning classifiers trained on a group of documents of the enterprise corresponding to a particular type of document. Such a classifier 192 may be, for example, one or more Support Vector Machines, linear regression models, logistic regression models, neural networks, nearest neighbor models, or naïve Bayes classifier(s). The classification or type of the document 186 determined by the classifier 192 may be stored in association with the document 186 (e.g., in the workspace 182 as metadata of the document 186). The document analyzer 194 may utilize the type of documents 186 in determining or displaying statistics associated with the documents 186. In this manner, the documents in the workspace on the content management system may be evaluated or analyzed to provide understanding or insight into the documents printed in the enterprise environment.

Figure 2:
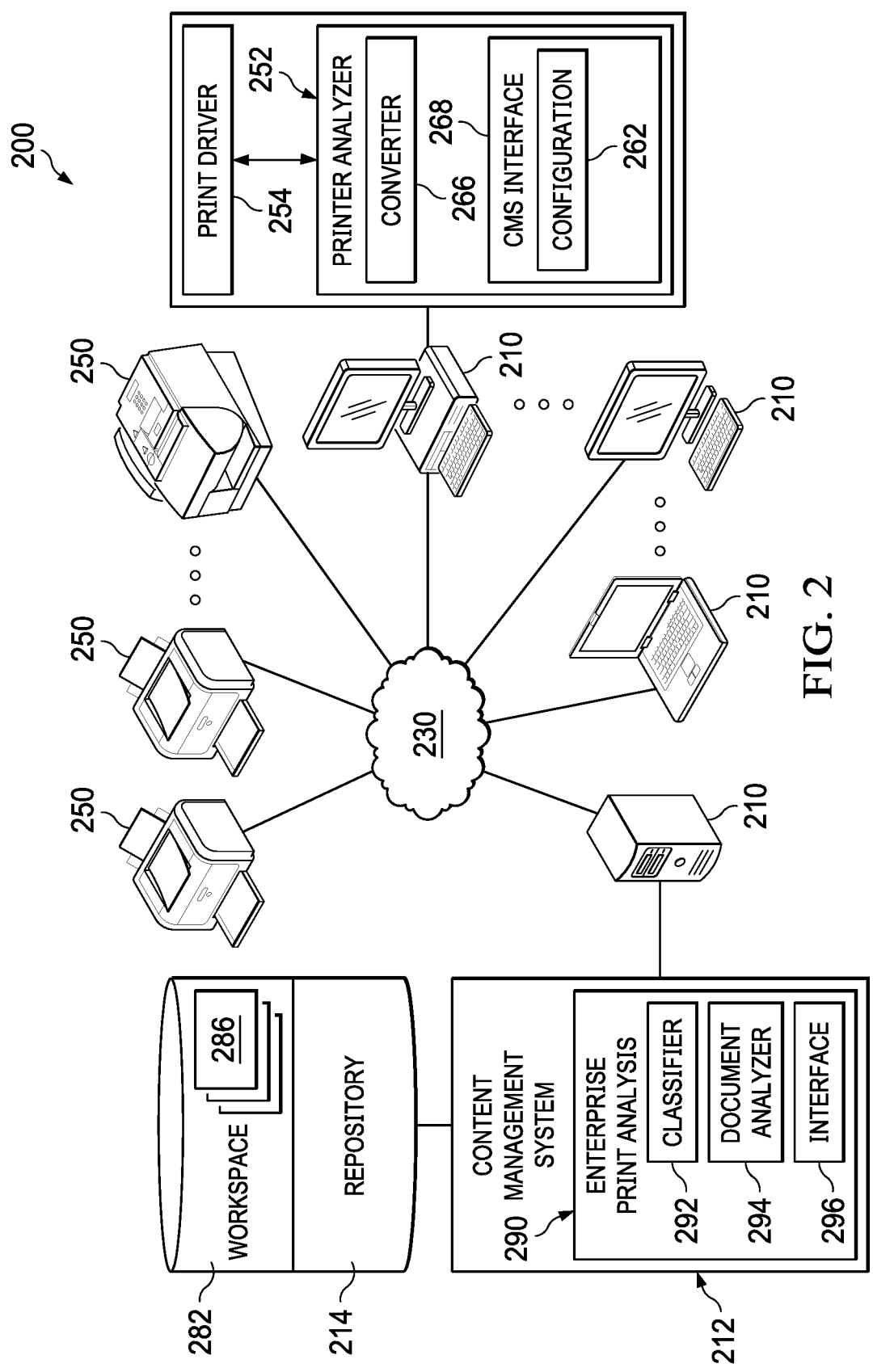
FIG. 2 depicts one embodiment of an enterprise environment where an embodiment of a print analyzer is deployed on a content management system within the enterprise in association with components deployed on computing devices distributed throughout the enterprise.

Moving now to FIG. 2, one embodiment of an enterprise environment where an embodiment of a print analyzer is deployed on computing devices within the enterprise is depicted. Here, enterprise computing environment 200 may include a number of computing devices 210 and printers 250 connected to a network 230 (e.g., the Internet, an intranet, an internet, a Wde Area Network (WAN), a Local Area Network (WAN), a cellular network, a wireless or wireline network, or some combination of networks). One of these computing devices 210 may include a content management system 212 and an associated document repository 214 for managing documents of the enterprise. As is known in the art, documents may be added to the content management system 212 (e.g., and stored in the repository 214) through an interface provided by the content management system 212. This interface may be, for example, be a REpresentational Sate Transfer (REST) interface, a Universal Resource Locator (URL), Application Programming Interface (API) or another type of interface. The content management system 212 may secure access to managed documents and manage or otherwise control these documents.

Users at particular computing devices 210 may print documents from these devices 210 at printers 250 within the enterprise computing environment 210. These documents may be documents managed by the content management system 212.

However, in many cases, the documents printed by the users at the computing devices 110 may not be managed by the content management system 212. For example, these printed documents may be documents created and stored by a user locally on their device 210, a document accessed from a portable storage media (e.g., a USB or Flash drive) or a document downloaded or accessed from a source external to the enterprise (not shown) over network 230. As discussed, these documents may originate from a source on the Internet or be documents stored in the cloud, such as those residing in a document sharing service or at a cloud based storage provider. The enterprise (e.g., its operators, owners, managers, administrators, etc.) may, however, still desire to control the security of such documents, or have policies that pertain to what may (or may not be) printed in the enterprise. Moreover, in some cases the deployment of print analyzers on printers 252 within the enterprise environment may be difficult.

Accordingly, in certain embodiments the enterprise may include print analyzer 252 (also referred to as the print analytics module) on one or more of computing devices in the enterprise environment 200. The print analyzer 252 may be integrated with a print driver 254 on the computing device 210, may be called from a print driver 254 or may emulate an interface of the print driver 254. The print analyzer 252 may be, for example, integrated with the print driver 254 and installed on the computing device 210 with the print driver 254. In this manner, the print analyzer 252 may be installed in association with the update or distribution of the print driver 254 on the computing device 210. For example, a print driver 254 including the print analyzer 252 may be distributed by, for example, a print management solution employed in the enterprise environment 200.

The print analyzer 252 may include a content management system (CMS) interface 268 that may be configured to access content management system 212 through the interface 296 provided by the content management system 212. This content management system interface 268 may be provided with a configuration 262 that specifies the interface 268 of the content management system 212 to call and may specify a location, file or workgroup to specify in association with the call to the interface 268 of the content management system 212. The print analyzer 252 also includes converter 266 that may convert the document into a canonical format. The canonical format may be PDF, for example. In addition, in some embodiments a document interpreter of the print analyzer 252 may process the copy of the document 262 in the canonical format such that text within the received document (in the canonical format) may be recognized or a text based search can be performed on the document. Embodiments of such processing include performing Optical Text Recognition (OCR) or the like.

When a document is printed by a user at a device 210, the document is sent to the print driver 254 at the user's device 210. The print driver 254 on the users device 210 thus receives the document in a print stream format (e.g., such as Advanced Function Presentation (AFP), Metacode/DJDE, Line data, PCL or PDF format) and stores the received document (in the print stream format). The print analyzer 252 is adapted to be invoked, execute, or otherwise operate after the print driver 254 receives the document. Thus, in certain embodiments, the print analyzer 252 may not interfere with the print driver 254 sending the document to the printer 250 to be printed as intended by the user. Additionally, in one embodiment, when a document is received at the print driver 254 it may be received with an identifier of the user who printed the document. This user identifier (e.g., username or network identifier for the user within the enterprise environment 200) may be stored in association with the document (e.g., as metadata or other associated data of the document).

The print analyzer 252 may then send a copy of the received document to the content management system 212 such that analysis of the document or printed documents generally may occur. In one embodiment, the print analyzer 252 may apply converter 266 to convert the document before the document is sent to the content management system 212. Additionally, the print analyzer 252 may apply a document interpreter such that text within the received document (in the canonical format) may be recognized.

In particular, in certain embodiments, the content management system 212 may include a named workspace 282 (e.g., a folder or other location) for storing and managing printed documents. This workspace or an identifier thereof, may be included in configuration 262 of CMS interface 268. Such a workspace 282 may, for example, be configured in the content management system 212 by an administrator associated with the enterprise. Print analyzer 252 may be adapted to add the received document to this workspace 282 by using CMS interface 268 to call interface 296 of the content management system 212 identifying the named workspace 282 as configured in configuration 296 and providing the converted document. Other data may be provided to the content management system 212 with the document, including, for example, an identifier of the user that printed the document, the time the document was printed or other data. Accordingly, when the document is received at the content management system 212 through the interface 296, the document 286 can be stored in the workspace 282. Additionally, any other data received with the document 286 (e.g., user identifier, time of printing, identifier of the device 210 that sent the document 286, etc.) may be stored in association with the document 286 (e.g., as metadata of the document 286).

As may be seen, then, the workspace 282 may include documents 286 printed across the enterprise environment 200 (as sent from various devices 210 within the enterprise environment). Accordingly, an analysis of these documents 186 may provide a great deal of understanding or insight into the documents being printed. Using these insights the operators or administrators of the enterprise may decide to employ additional, or different, security measures with respect to printed documents or, more generally, take action such that the volume of documents being printed within the enterprise environment may be reduced.

An enterprise wide print analysis system 290 may thus be implemented in the enterprise environment 200. This enterprise print analysis system 290 may be include on the content management system 212 itself, or may be on another computing device 210 of the enterprise environment and adapted to access the workspace 282 including the documents 286 printed across the enterprise environment 200. The enterprise wide print analysis system 290 may include a document analyzer 294 that may determine one or more statistics regarding the document 286 (e.g., where they were printed, volume of documents printed, types of documents printed, users who printed documents, etc.) and display such statistics to users through interface 296 of the enterprise wide print analysis system 290.

In one embodiment, the enterprise print analysis system includes a classifier 292.

This classifier 292 may be adapted to classify each document 286 as one or more types of documents. Specifically, in one embodiment, the classifier 192 may include one or more machine learning classifiers trained on a group of documents of the enterprise corresponding to a particular type of document as discussed. The classification or type of the document 286 determined by the classifier 292 may be stored in association with the document 286 (e.g., in the workspace 282 as metadata of the document 186). The document analyzer 294 may utilize the type of documents 286 in determining or displaying statistics associated with the documents 286. In this manner, the documents in the workspace on the content management system may be evaluated or analyzed to provide understanding or insight into the documents printed in the enterprise environment.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, that follow, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure.

What is claimed is:

1. A system for controlling the printing of documents in an enterprise environment, comprising:
a printer, including:
a processor; and
a non-transitory computer readable medium, wherein the printer is coupled to a set of computing devices of an enterprise over a network, and is adapted to print documents received at the printer, wherein the non-transitory computer readable medium comprises instructions executable on the processor for:
a print driver for receiving documents to be printed from computing devices; and
a print analyzer communicating with the print driver on the printer, the print analyzer for:
receiving a document from the print driver in a print stream format;
converting the received document from the print stream format to a canonical format;
applying a set of print analysis rules to the converted document, wherein each print analysis rule comprises a trigger including a regular expression and an associated action and applying the rule comprises:
searching the converted document using the regular expression of the trigger to determine if the converted document contains any data matching the regular expression, and
taking the associated action of the rule when the regular expression is matched, wherein the action is sending the document to a content management system by calling an interface of the content management system wherein the call to the interface comprises parameters including a named workspace provided at the content management system, the document, a time of printing, an identifier of the printer, and an identifier of a user who printed the document, and wherein the named workspace comprises documents printed from across the enterprise environment in association with metadata of the document that includes the time of printing, an identifier of the printer the identifier of the user who printed the document, and wherein the content management system includes an enterprise analysis system for:
accessing the named workspace at the content management system;
analyzing the documents stored in the named workspace to determine one or more statistics regarding documents in the workspace printed across the enterprise environment, wherein the one or more statistics include or one or more statistics related to where documents were printed, volume of documents printed, types of documents printed or users who printed documents; and
providing an interface to access the one or more statistics regarding the documents in the workspace printed across the enterprise environment.

2. The system of claim 1, wherein analyzing the document to determine one or more statistics regarding documents in the workspace printed across the enterprise environment comprises:
determining one or more classes for the documents in the workspace printed across the enterprise environment;

associating each of the documents in the workspace with one of the classes.

3. The system of claim 1, wherein the action is cancelling the printing of the document at the printer.

4. The system of claim 1, wherein the action is redacting the document of the data in the document matching the regular expression.

5. The system of claim 1, wherein the action is sending an alert to a specified destination.

6. The system of claim 5, wherein the document is received with the user identifier for the user who printed the document and sending an alert to a specified destination comprises requesting the specified destination associated with the user identifier from a directory server.

7. A system for analyzing documents printed in an enterprise environment, comprising:
 a computing device, including:
  a processor; and
  a non-transitory computer readable medium comprising instructions executable on the processor for:
   a print driver for receiving a document to be printed in a print stream format and sending the received document to a printer; and
   a print analyzer communicating with the print driver on the computing device, the print analyzer for:
    receiving the document from the print driver in a print stream format;
    converting the received document from the print stream format to a canonical format; and
    sending the document to a content management system, wherein sending the document to the content management system comprises calling an interface of the content management system wherein the call to the interface comprises parameters including a named workspace provided at the content management system, the document, a time of printing, an identifier of the printer, and an identifier of a user who printed the document, and wherein the named workspace comprises documents printed from across the enterprise environment in association with metadata of the document that includes the time of printing, an identifier of the printer the identifier of the user who printed the document, and wherein the content management system includes an enterprise analysis system for:
     accessing the named workspace at the content management system;
     analyzing the documents stored in the named workspace to determine one or more statistics regarding documents in the workspace printed across the enterprise environment, wherein the one or more statistics include or one or more statistics related to where documents were printed, volume of documents printed, types of documents printed or users who printed documents; and
     providing an interface to access the one or more statistics regarding the documents in the workspace printed across the enterprise environment.

8. The system of claim 7, wherein analyzing the document to determine one or more statistics regarding documents in the workspace printed across the enterprise environment comprises:
 determining one or more classes for the documents in the workspace printed across the enterprise environment;
 associating each of the documents in the workspace with one of the classes.

9. A non-transitory computer readable medium for controlling the printing of documents in an enterprise environment, comprising instructions for:
 a print driver for receiving documents to be printed from computing devices at a printer, wherein the printer is coupled to a set of computing devices of an enterprise over a network, and is adapted to print documents received at the printer; and
 a print analyzer communicating with the print driver on the printer, the print analyzer for:
  receiving a document from the print driver in a print stream format;
  converting the received document from the print stream format to a canonical format;
  applying a set of print analysis rules to the converted document, wherein each print analysis rule comprises a trigger including a regular expression and an associated action and applying the rule comprises:
   searching the converted document using the regular expression of the trigger to determine if the converted document contains any data matching the regular expression, and
   taking the associated action of the rule when the regular expression is matched, wherein the action is sending the document to a content management system by calling an interface of the content management system wherein the call to the interface comprises parameters including a named workspace provided at the content management system, the document, a time of printing, an identifier of the printer, and an identifier of a user who printed the document, and wherein the named workspace comprises documents printed from across the enterprise environment in association with metadata of the document that includes the time of printing, an identifier of the printer the identifier of the user who printed the document, and wherein the content management system includes an enterprise analysis system for:
    accessing the named workspace at the content management system;
    analyzing the documents stored in the named workspace to determine one or more statistics regarding documents in the workspace printed across the enterprise environment, wherein the one or more statistics include or one or more statistics related to where documents were printed, volume of documents printed, types of documents printed or users who printed documents; and
    providing an interface to access the one or more statistics regarding the documents in the workspace printed across the enterprise environment.

10. The non-transitory computer readable medium of claim 9, wherein analyzing the document to determine one or more statistics regarding documents in the workspace printed across the enterprise environment comprises:
 determining one or more classes for the documents in the workspace printed across the enterprise environment;
 associating each of the documents in the workspace with one of the classes.

11. The non-transitory computer readable medium of claim 9, wherein the action is cancelling the printing of the document at the printer.

12. The non-transitory computer readable medium of claim 9, wherein the action is redacting the document of the data in the document matching the regular expression.

13. The non-transitory computer readable medium of claim 9, wherein the action is sending an alert to a specified destination.

14. The non-transitory computer readable medium of claim 13, wherein the document is received with the user identifier for the user who printed the document and sending an alert to a specified destination comprises requesting the specified destination associated with the user identifier from a directory server.

15. A non-transitory computer readable medium for analyzing documents printed in an enterprise environment, comprising instructions for:
   a print driver for receiving a document to be printed in a print stream format on a computing device and sending the received document to a printer; and
   a print analyzer communicating with the print driver on the computing device, the print analyzer for:
      receiving the document from the print driver in a print stream format;
      converting the received document from the print stream format to a canonical format; and
      sending the document to a content management system, wherein sending the document to the content management system comprises calling an interface of the content management system wherein the call to the interface comprises parameters including a named workspace provided at the content management system, the document, a time of printing, an identifier of the printer, and an identifier of a user who printed the document, and wherein the named workspace comprises documents printed from across the enterprise environment in association with metadata of the document that includes the time of printing, an identifier of the printer the identifier of the user who printed the document, and wherein the content management system includes an enterprise analysis system for:
      accessing the named workspace at the content management system;
      analyzing the documents stored in the named workspace to determine one or more statistics regarding documents in the workspace printed across the enterprise environment, wherein the one or more statistics include or one or more statistics related to where documents were printed, volume of documents printed, types of documents printed or users who printed documents; and
      providing an interface to access the one or more statistics regarding the documents in the workspace printed across the enterprise environment.

16. The non-transitory computer readable medium of claim 15, wherein analyzing the document to determine one or more statistics regarding documents in the workspace printed across the enterprise environment comprises:
   determining one or more classes for the documents in the workspace printed across the enterprise environment;
   associating each of the documents in the workspace with one of the classes.

* * * * *